(12) United States Patent
Yamamoto

(10) Patent No.: US 7,006,241 B1
(45) Date of Patent: Feb. 28, 2006

(54) COMMUNICATION APPARATUS

(75) Inventor: Hiroyuki Yamamoto, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/504,117

(22) Filed: Feb. 15, 2000

(30) Foreign Application Priority Data

Feb. 15, 1999 (JP) ................................. 11-036242

(51) Int. Cl.
  *G06F 15/00* (2006.01)
(52) U.S. Cl. ................... 358/1.15; 358/402; 358/407; 709/206
(58) Field of Classification Search ................ 358/1.15, 358/402, 403, 407, 434, 440, 442, 468; 709/206, 709/207, 236, 245
  See application file for complete search history.

(56) References Cited

U.S. PATENT DOCUMENTS 5,084,770 A * 1/1992 Nakayama ................ 358/403
5,974,449 A * 10/1999 Chang et al. ............... 709/206
6,088,125 A * 7/2000 Okada et al. ............... 358/405
6,384,927 B1 * 5/2002 Mori ......................... 358/1.15
6,574,670 B1 * 6/2003 Eguchi ....................... 709/245

FOREIGN PATENT DOCUMENTS

| JP | A-10-40183 | | 2/1998 |
| WO | WO 9110668 A1 | * | 3/1997 |

* cited by examiner

*Primary Examiner*—Joseph R. Pokrzywa
(74) *Attorney, Agent, or Firm*—Oliff & Berridge, PLC

(57) ABSTRACT

The invention provides a internet facsimile apparatus of a communication apparatus that selectively attaches or does not attach various transmission information (header information) according to receivers. When a user set a read medium on an image reading unit, a receiver's mail address input through a control panel is checked. When the input receiver's mail address does not have the same domain name as the internet facsimile apparatus and is not the mail address for which non-attachment of the transmission information is preset, the transmission information is attached, via the transmission information attaching unit, to a part of the image information obtained by reading the image information formed on the read medium. Then, the read image information is transmitted to the receiver.

20 Claims, 9 Drawing Sheets

Fig. 5A
```
From        :abc@de.fgh.co.jp
To          :ijk@de.fgh.co.jp
Date        :THU,14 JAN 1999 00:14:21
Subject     :JAPAN MAP
Content-Type :Text/plain;charset="ISO-2022JP"
IMAGE DATA IN TIFF-F FORMAT ATTACHED.
Content-Type :Image/tiff;name="image.tif"
```
IMAGE DATA (TIFF-F FORMAT)
Fig. 5B
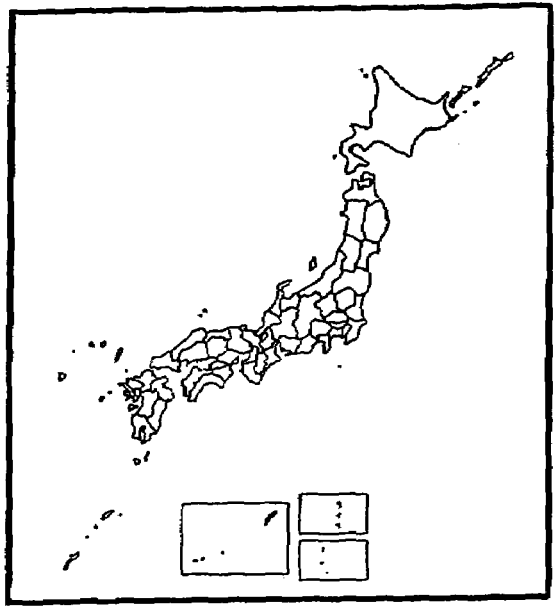
Fig. 5C
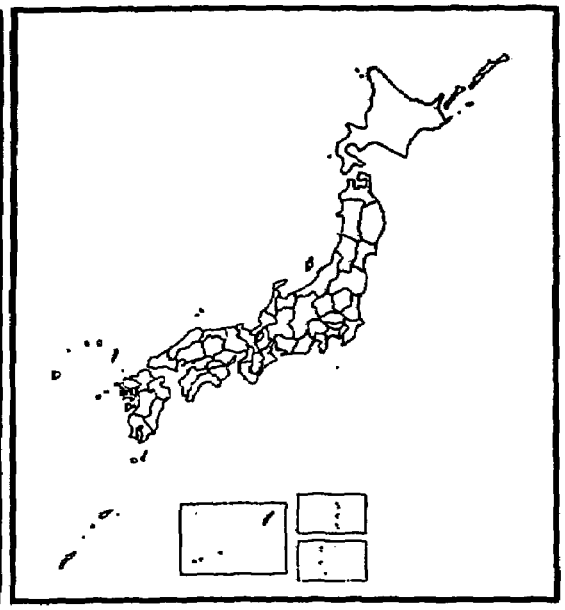

Fig. 6A
```
From        :abc@de.fgh.co.jp
To          :lmn@op.qrs.co.jp
Date        :THU,14 JAN 1999 00:14:21
Subject     :JAPAN MAP
Content-Type :Text/plain;charset="ISO-2022JP"
IMAGE DATA IN TIFF-F FORMAT ATTACHED.
Content-Type :Image/tiff;name="image.tif"
```
IMAGE DATA (TIFF-F FORMAT)
Fig. 6B
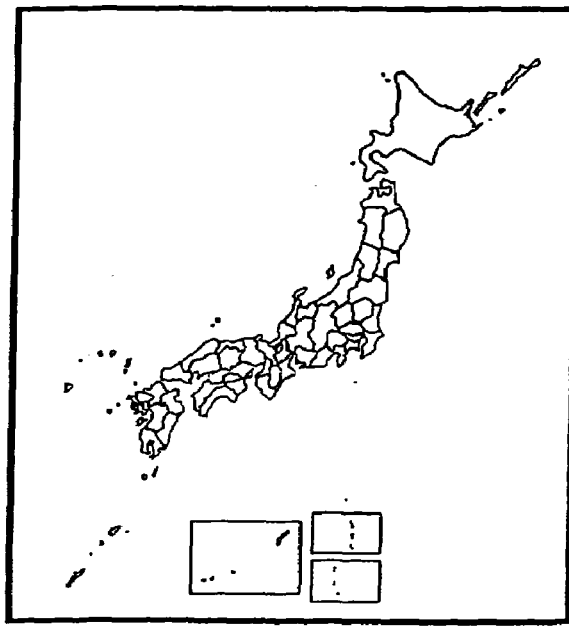
Fig. 6C
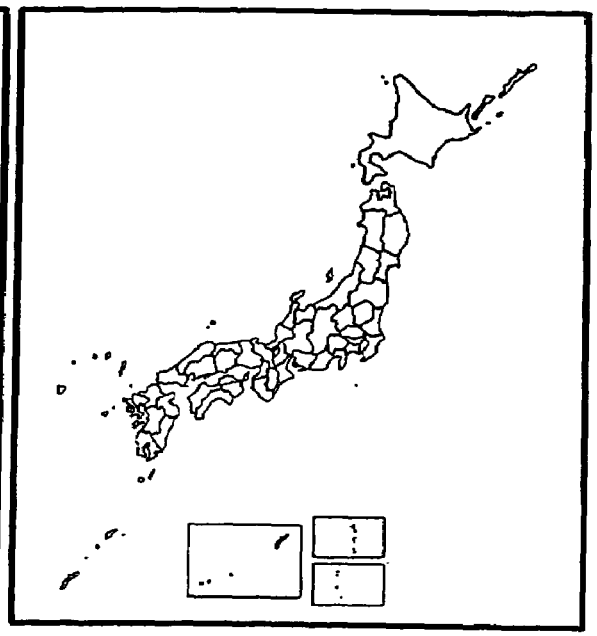

Fig. 7A
```
From        :abc@de.fgh.co.jp
To          :tuv@wx.yza.co.jp
Date        :THU,14 JAN 1999 00:14:21
Subject     :JAPAN MAP
Content-Type :Text/plain;charset="ISO-2022JP"
IMAGE DATA IN TIFF-F FORMAT ATTACHED.
Content-Type :Image/tiff;name="image.tif"
```
IMAGE DATA (TIFF-F FORMAT)
+
TRANSMISSION INFORMATION
(TRANSMITTER, TRANSMISSION DATA, ETC.)
Fig. 7B
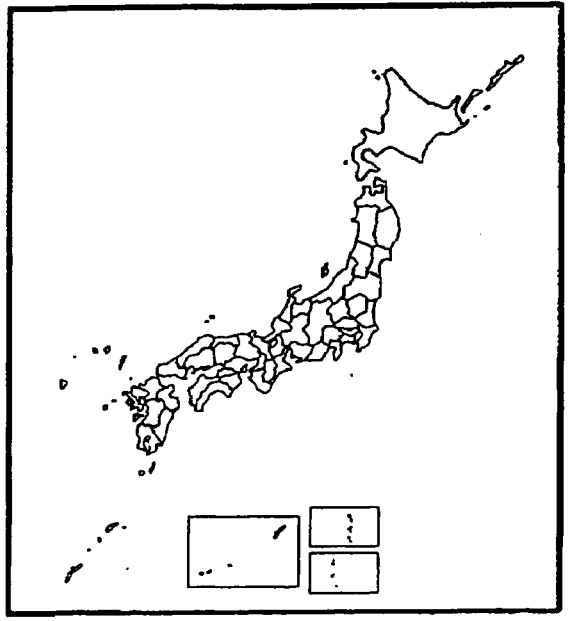
Fig. 7C
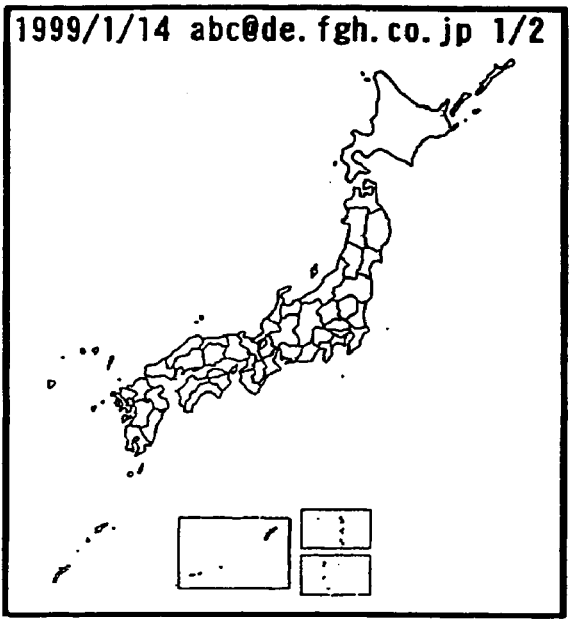

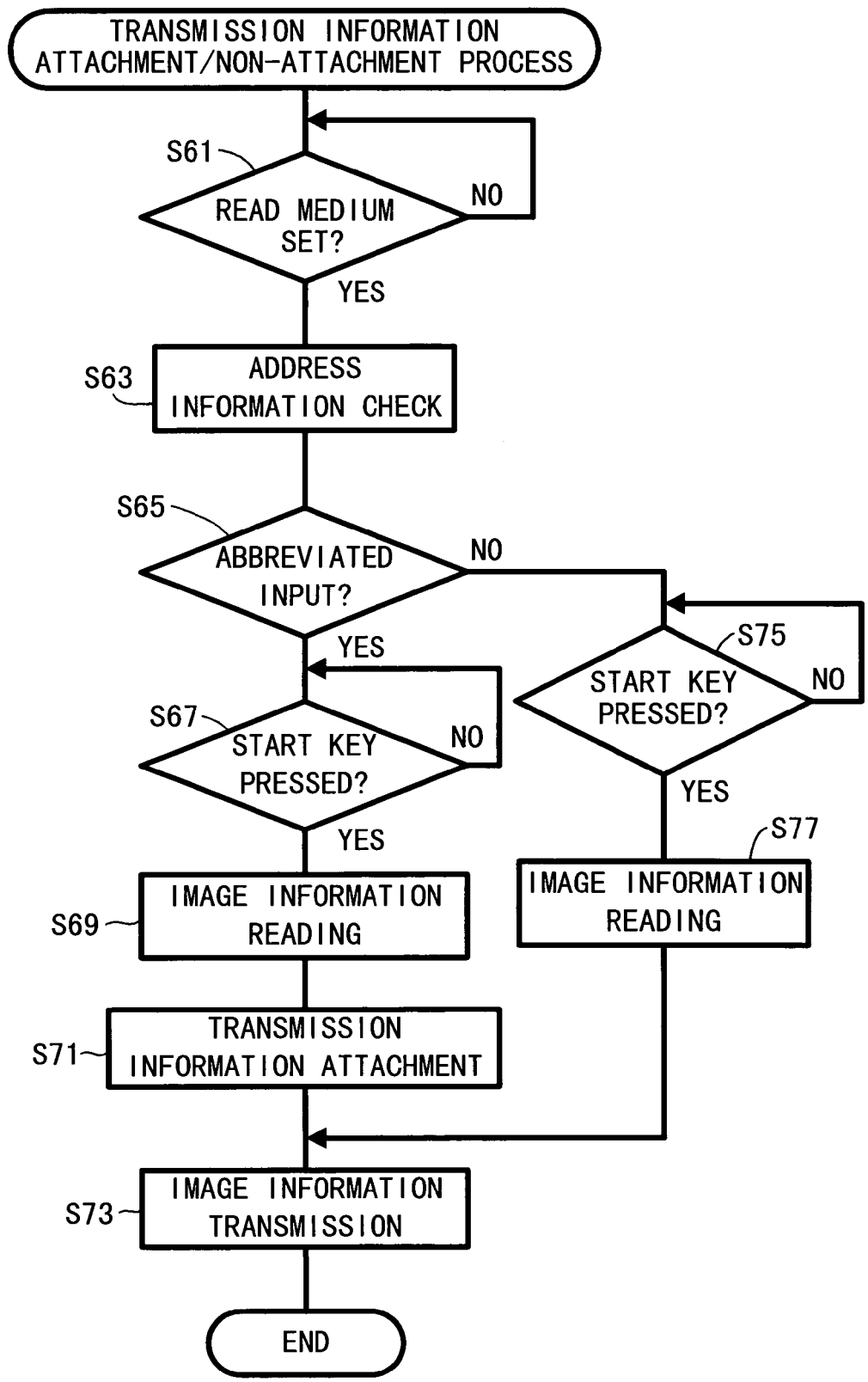

COMMUNICATION APPARATUS

BACKGROUND OF THE INVENTION

1. Field of Invention

The invention relates to a communication apparatus, such as a facsimile apparatus, capable of transmitting to a receiver image information formed on a read medium, for example, on a document, through a line. Specially, the invention relates to the communication apparatus that selectively attaches or does not attach various transmission information (header information) according to receivers, so that the facility of the communication apparatus is increased.

2. Description of Related Art

A communication apparatus capable of transmitting image information formed on a read medium to a receiver, via a communication line are commercialized.

As for such communication apparatus, there is known, for example, an ordinary facsimile apparatus that sends image information to a receiver using an ordinary public telephone line, and an internet facsimile apparatus capable of sending the image information to a receiver, through a network (communication line network), such as the Internet and intranet. The internet facsimile apparatus may include an image reading unit capable of reading image information formed on a read medium, an address inputting unit capable of inputting receiver's address information (for example, a receiver's facsimile number or mail address), a transmission information attaching unit capable of attaching various transmission information (header information), such as a transmitter, date and time of transmission, and the number of transmitted pages. In the above-described internet facsimile apparatus, the various transmission information is attached to a part of the image information read via the image reading unit (for example, top or bottom thereof out of the read image information range). The image information is transmitted to a receiver connected via a network, with the various transmission information attached. The receiver receives the image information of the read medium with the transmission information attached thereto, so that the receiver may easily understand when and how much the image information is transmitted by whom.

However, when the transmitter sends the image information, using the above-described internet facsimile apparatus, without the transmission information attached for the receiver's sake (such as when the receiver wants to receive the same image information as a transmitter sends) or for the transmitter's sake (such as when the transmitter wants to send the image information anonymously), the several settings have to be changed in procedural steps in the transmitter-side internet facsimile apparatus. Such setting changes are inconvenient for users.

SUMMARY OF THE INVENTION

Accordingly, one aspect of the invention is to provide a communication apparatus that selectively attaches or does not attach various transmission information (header information) according to receivers, so that communication can be conducted easily.

Another aspect of the invention is to provide a communication apparatus in which attachment/non-attachment of the various transmission information can be easily set or changed.

To achieve one aspect of the invention, a communication apparatus of the invention is capable of transmitting to a receiver image information with transmission information attached to a part of the image information, via a communication line. The communication apparatus may include an address inputting device capable of inputting address information of the receiver, a setting device that sets an attachment or a non-attachment of the transmission information in association with the address information, a storage device that stores the address information for which the attachment/non-attachment of the transmission information is set, a transmission information attaching device that attaches/does not attach the transmission information to the image information, based on the address information stored in the storage device, and a transmission device that transmits the image information with/without the transmission information attached thereto by the transmission information attaching device.

In the communication apparatus, the various transmission information can selectively be attached to a part of the image information according to the receiver's address information. Therefore, when the transmission information is required for a receiver every time the image information is sent to the receiver, a user of the communication apparatus does not have to change some settings as to the transmission information attachment/non-attachment every time. Consequently, the time required and some burden placed on the user when the image information is transmitted, can be saved and reduced.

BRIEF DESCRIPTION OF THE DRAWINGS

Preferred embodiments of the invention will be described in detail with reference to the following figures wherein:

FIG. 5A is a figure illustrating data contents when image information is transmitted to a receiver-side facsimile apparatus, via the internet facsimile apparatus;

FIG. 5B is a figure illustrating image information formed on a read medium;

FIG. 5C is a figure illustrating image information received by the receiver-side facsimile apparatus;

FIG. 6A is a figure illustrating data contents when image information is transmitted to a receiver-side facsimile apparatus, via the internet facsimile apparatus;

FIG. 6B is a figure illustrating image information formed on a read medium.

FIG. 6C is a figure illustrating image information received by the receiver-side facsimile apparatus;

FIG. 7A is a figure illustrating data contents when image information is transmitted to a receiver-side facsimile apparatus, via the internet facsimile apparatus;

FIG. 7B is a figure illustrating an image information formed on a read medium;

FIG. 7C is a figure illustrating an image information received by the receiver-side facsimile apparatus.

FIG. 9 is a flowchart illustrating a transmission information attachment/non-attachment process according to one embodiment of the invention.

Further objects, details, and advantages of the invention will be apparent from the following detailed description, when read in conjunction with the drawings.

DETAILED DESCRIPTION OF PREFERRED EMBODIMENTS

Preferred embodiments of the invention will be described in detail hereinafter with reference to the accompanying drawings.

Figure 1:
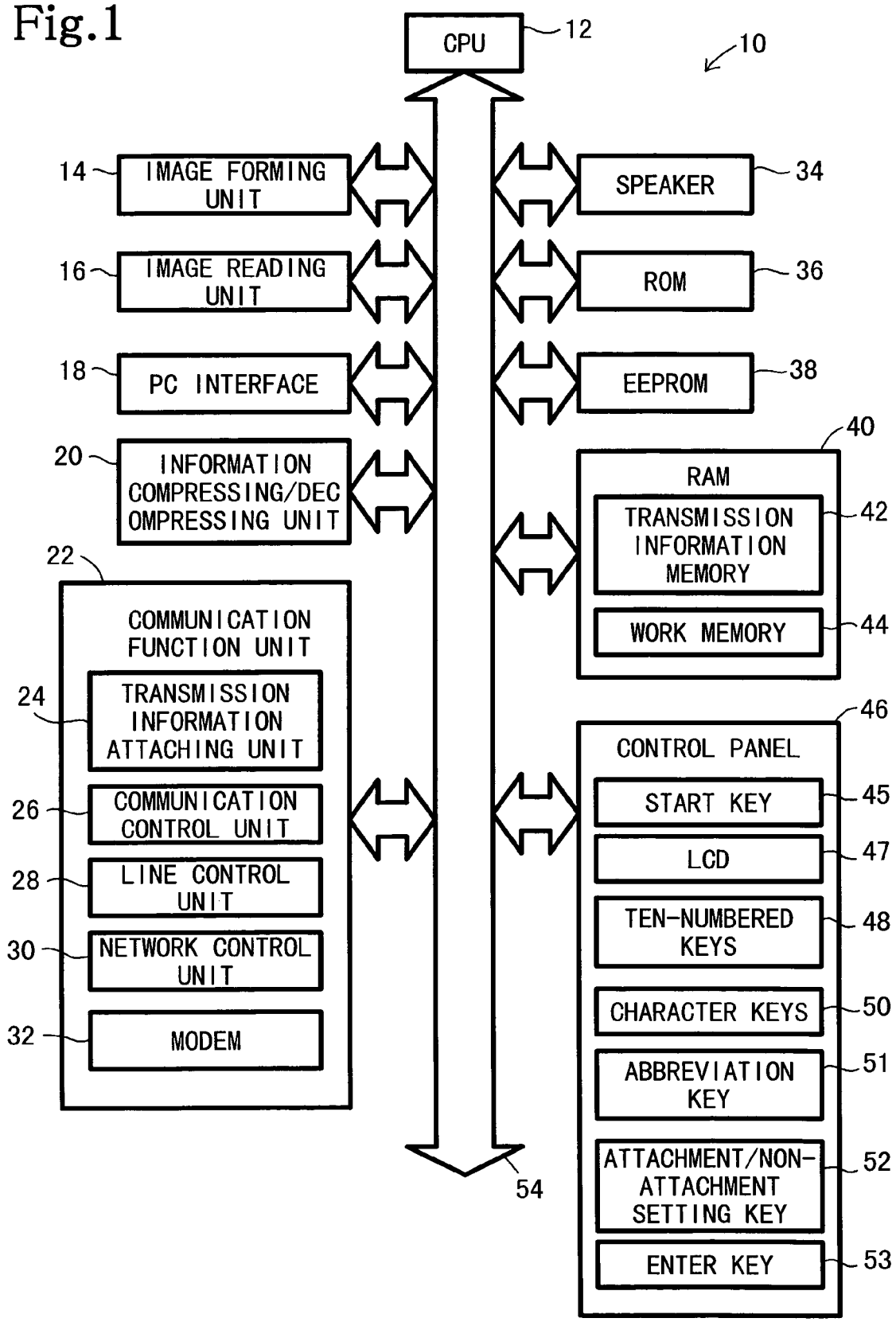
FIG. 1 is a block diagram illustrating the construction of an internet facsimile apparatus of a communication apparatus according to an embodiment of the invention.

FIG. 1 is a block diagram illustrating the construction of an internet facsimile apparatus of a communication apparatus according to an embodiment of the invention.

As shown in FIG. 1, the internet facsimile apparatus 10 includes the following components: an image forming unit 14 capable of forming image information (including characters and numbers) to be recorded onto a print medium; an image reading unit 16, provided with an optical character reader, capable of reading the image information formed on a read medium; a personal computer (PC) interface 18 capable of interchanging information with a personal computer (not shown); an information compressing/decompressing unit 20 that compresses the image information read via the image reading unit 16 or decompresses the received image information; a communication function unit 22 that directly controls the data transmission/reception processing performed by the internet facsimile apparatus 10; a speaker 34 capable of outputting voices and error sounds; a read-only memory (ROM) 36 that stores, for example, a program for the transmission information attachment/non-attachment process (described below) and a font data; an electrically erasable programmable ROM (EEPROM) 38 capable of registering and storing the receiver's address information (for example, a receiver's facsimile number or a receiver's mail address) input via a control panel 46 (described below) and the information as to the setting according to receivers, of the attachment/non-attachment of the various transmission information (header information) including the transmitter, date and time of transmission, and the number of transmitted pages; a random-access memory (RAM) 40 capable of storing/erasing various information; and the control panel 46 having key stitches capable of inputting an operation instruction by a user, a liquid crystal display (LCD) capable of showing, for example, various processing results and information as to an address. The above-described components are connected to a CPU 12 via a bus 54 and controlled by the CPU 12.

The communication function unit 22 includes the following elements: a transmission information attaching unit 24 capable of attaching the various transmission information to a part of the image information (for example, top or bottom thereof out of the read image information range); a communication control unit 26 that performs communication controls; a line control unit 28 that performs the line controls between the internet facsimile apparatus 10 and a public telephone line 56 which will be described below (see FIG. 2); a network control unit 30 that performs line controls between the internet facsimile apparatus 10 and a local area network (LAN) 68 which will be described below (see FIG. 2); and a modem 32 that modulates and demodulates signals.

The RAM 40 includes a transmission information memory 42 capable of storing pieces of the various transmission information as to the transmitted image information and a work memory 44 capable of temporarily storing data to be required when the transmission/reception of the image information is executed.

The control panel 46 includes a start key 45 for starting the reading or the transmission of the image information, a liquid crystal display (LCD) capable of showing, for example, various processing results and information as to an address, ten-numbered keys 48 capable of inputting, for example, a receivers' facsimile number and various numerical information, character keys 50 capable of inputting, for example, a receiver's mail address and a receiver's name, an abbreviation key 51 associated with a receiver's facsimile number or mail address so that the receiver's address information can be input by pressing the abbreviation key 51, an attachment/non-attachment setting key 52 capable of selectively setting the attachment/non-attachment of the transmission information and the key 52 having various functions such as those described below, and an enter key 53 for entering inputs.

Figure 2:
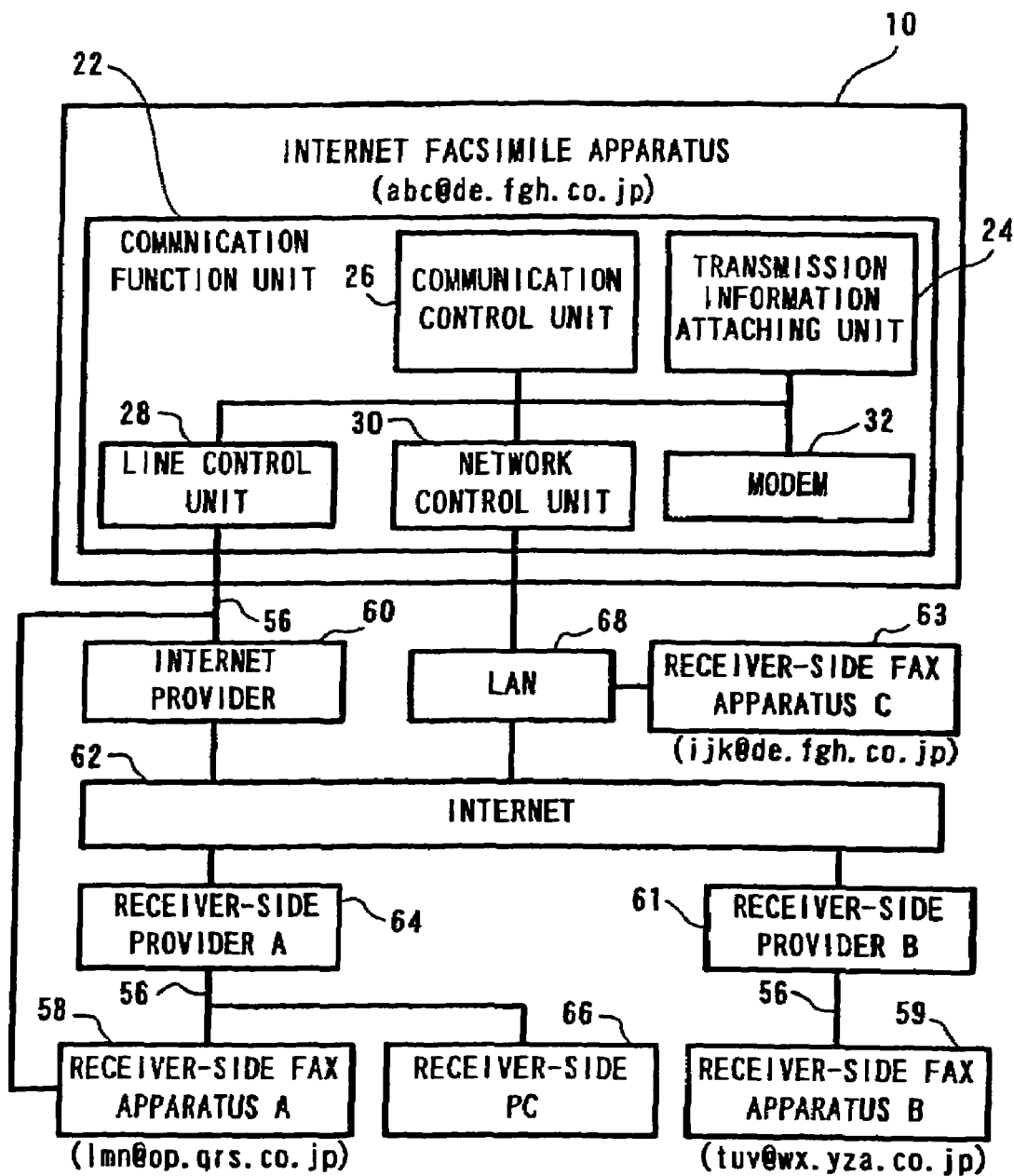
FIG. 2 is a block diagram illustrating the construction of a part of the internet facsimile apparatus and a network of communication lines to which the internet facsimile apparatus is connected.

FIG. 2 is a block diagram illustrating the construction of a part of the internet facsimile apparatus 10 and a network of communication lines to which the internet facsimile apparatus 10 shown in FIG. 1 is connected, wherein the communication function unit 22 of the facsimile apparatus 10, which plays an important role in performing communications, is mainly illustrated and other components are omitted to simplify the illustration.

As shown in FIG. 2, the facsimile apparatus 10 may connect the line control unit 28 and the Internet 62, via the public telephone line 56 and an internet provider 60. The facsimile apparatus 10 may also connect the network control unit 30 and the Internet 62, via the LAN 68. A receiver-side facsimile (fax) apparatus A 58 and a receiver-side personal computer (PC) 66 are connected to the Internet 62, via the public telephone line 56 and a receiver-side provider A 64. The receiver-side fax apparatus A 58 is also connected to the internet facsimile apparatus 10, via the public telephone line 56. Similarly, a receiver-side facsimile (fax) apparatus B 59 is connected to the Internet 62 via the public telephone line 56 and a receiver-side provider B 61. A receiver-side facsimile (fax) apparatus C 63 is connected to the Internet 62 via the same LAN 68 as the internet facsimile apparatus 10 is on. Each of the internet facsimile apparatus 10, the fax apparatus A 58, B 59 and C63 has its own mail address of abc@de.fgh.co.jp, lmm@op.qrs.co.jp, tuv@wx.yza.co.jp, and ijk@de.fgh.co.jp, respectively. The mail addresses consists of an account name, followed by an at mark (@) followed by a domain name. That is, the account name is placed before the at mark (@) (the left-side part of the mail address). The domain name is placed after the at mark (@) (the right-side part of the mail address). The domain name includes the letters representing the country, for example, jp for Japan and fr for France, and those representing the type of organization, for example, "co"/"com" for commercial organizations and "go"/"gov" for government agencies. The account name indicates the user name in the organization, so that the users can thereby be identified. The fax apparatus A 58 has a predetermined facsimile number (for example, 03-1234-5678) that can be connected via the public telephone line 56.

Figure 3:
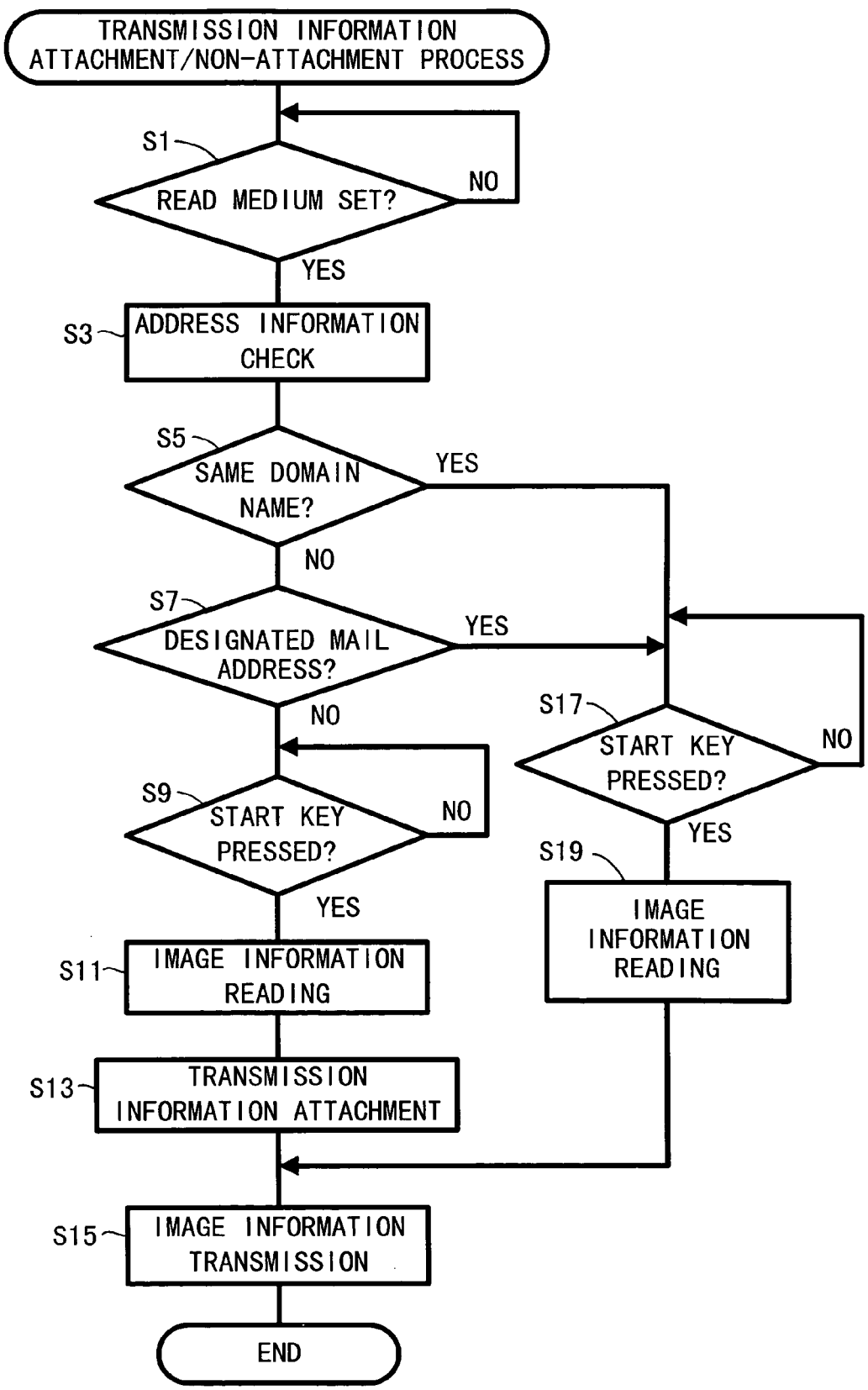
FIG. 3 is a flowchart illustrating a transmission information attachment/non-attachment process.

The transmission information attachment/non-attachment process in which the various transmission information is selectively attached or not attached to a part of the image information according to the receivers' mail addresses, when the image information is transmitted to each of the above-described receiver-side fax apparatus, will be described in detail with reference to the flowchart shown in FIG. 3.

First, it is determined that the read medium has been set on the image reading unit 16 by a user (S1). When the read medium is not set on the image reading unit 16 (NO in S1), the stand-by state will continue until the user sets the read medium on the image reading unit 16. During the stand-by state (NO in S1), the user may set the attachment/non-attachment of the various transmission information according to receivers' mail addresses or the domain names, by operating the attachment/non-attachment setting key 52 provided on the control panel 46.

With reference to the flowchart shown in FIG. 4, the setting of attaching/not-attaching the various transmission information will be described in detail below. When the read medium is not set on the internet facsimile apparatus 10 and the attachment/non-attachment setting key 52 is pressed, the internet facsimile apparatus 10 goes to the setting process of attaching/not attaching the various transmission information according to receivers. First, an user may input a particular domain name of address information, for example, the same domain name as the internet facsimile apparatus 10 (de.fgh.co.jp), using the character keys 50, and the like (S21). For example, the domain name of *@de.fgh.co.jp, is input using the character keys 50 and the like, and is indicated on the LCD 47. An asterisk * indicates that the asterisk can assume any account name if the domain name following the at mark (@) matches. To set the non-attachment of the various transmission for the addresses including the domain name of de.fgh.co.jp, "NOT-ATTACHED" is indicated on the LCD 47 by pressing the attachment/non-attachment setting key 52 (NO in S23). The attachment/non-attachment setting key 52 is a toggle switch. Every time the key 52 is pressed, the indication on the LCD 47 changes between, for example, "ATTACHED" and "NOT-ATTACHED". When "NOT-ATTACHED" is indicated on the LCD 47 and the enter key 53 is pressed (YES in S29), the non-attachment of the transmission information is set for the addresses including the domain name of de.fgh.co.jp (S31). Therefore, the transmission information is not attached to the image information to be transmitted to any receivers having the same domain name as "de.fgh.co.jp". To set the non-attachment of the various transmission information to the image information to be transmitted to a particular mail address, for example, lmn@op.qrs.co.jp, the address lmn@op.qrs.co.jp is input using the character keys 50 and the like, in step 21, and is shown on the LCD 47. Then, "NOT-ATTACHED" is indicated on the LCD 47 by pressing the attachment/non-attachment setting key 52 (NO in S23), and the enter key 53 is pressed (YES in S29), so that the non-attachment of the transmission information is set for the address, lmn@op.qrs.co.jp (S31). The embodiment will be further explained below, referring to the setting as described above. However, the setting may be performed in the following manner. A particular domain name or a particular mail address is first input and is shown on the LCD 47 (S21). Thereafter, the "ATTACHED" is indicated on the LCD 47 by pressing the attachment/non-attachment setting key 52 (YES in S23) and the enter key 53 is pressed (YES in S25), so that the attachment of the transmission information is set for the address including the particular domain name or the particular mail address (S27). In the transmission information attachment/non-attachment process described below, the transmission information is not attached to the image information to be transmitted to the addresses, for example, having the same domain name as the transmitter-side internet facsimile apparatus 10 (de.fgh.co.jp) and the address (lmn@op.qrs.co.jp) selected by the user.

When the read medium is set on the image reading unit 16 (YES in S1), the receiver's mail address input via the control panel 46 is checked (S3). Then, it is determined whether the input receiver's mail address has the same domain name (de.fgh.co.jp) as in the mail address of the internet facsimile apparatus 10 (abc@de.fgh.co.jp) (S5). When the input receiver's mail address has the same domain name as that of the internet facsimile apparatus 10 (YES in S5) and the start key 45 is pressed (YES in S17), the image information on the read medium, which is set on the image reading unit 16, is read (S19) and the read image information is transmitted to the receiver (S15). The transmission information attachment/non-attachment process is then finished. In this case, the image information is transmitted to the receiver without the various transmission information attached.

When the input receiver's mail address does not have the same domain name as the internet facsimile apparatus 10 (NO in S5), it is determined whether the input receiver's mail address is the mail address (lmn@op.qrs.co.jp) for which non-attachment of the various transmission information is preset via the attachment/non-attachment setting key 52 provided on the control panel 46 (S7). When the input receiver's mail address is the mail address for which non-attachment of the various transmission information is preset (YES in S7) and the start key 45 is pressed (YES in S17), the image information on the read medium set on the image reading unit 16, is read (S19) and the read image information is transmitted to the receiver (S15). The transmission information attachment/non-attachment process is then finished. In this case, the image information is also transmitted to the receiver without the various transmission information attached.

When the input receiver's mail address is not the mail address (lmn@op.qrs.co.jp) for which non-attachment of the various transmission information is preset (NO in S7), and the start key 45 is pressed (YES in S9), the image information on the read medium set on the image reading unit 16 is read (S11). Various transmission information is attached, via the transmission information attaching unit 24, to a part of the image information obtained by reading the read medium (S13) and the read image information is transmitted to the receiver (S15). The transmission information attachment/non-attachment process is then finished. In this case, image information is transmitted to the receiver with the various transmission information attached.

The results that will be obtained when the transmission information attachment/non-attachment process is performed according to the flow shown in FIG. 3, will be explained in detail with reference to FIGS. 5–7. FIGS. 5A, 6A, and 7A show data contents when image information is transmitted to receiver-side facsimile apparatus, via the internet facsimile apparatus 10. FIGS. 5B, 6B, and 7B show image information formed on a read medium. FIGS. 5C, 6C, and 7C show image information received by the receiver-side facsimile apparatus. The data contents shown in FIGS. 5A, 6A, and 7A are formed in a format conforming to the electronic mail standard of Multipurpose Internet Mail Extensions (MIME). The data contents include various information required for the transmission and reception of the image information, in addition to the image data converted in the TIFF-F format after the image information formed on the read medium is read by the image reading unit 16.

FIG. 5C shows the results of the transmission information attachment/non-attachment process carried out when the internet facsimile apparatus 10 (abc@de.fgh.co.jp) (see "From" in FIG. 5A) transmits to the receiver-side fax apparatus C 63 (ijk@de.fgh.co.jp) (see "To" in FIG. 5A) at 14:21 on Thursday, the 14 Jan., 1999 (see "Date" in FIG. 5A), the image information regarding the Japan map (see "Subject" in FIG. 5A). Since the receiver-side fax apparatus C 63 (ijk@de.fgh.co.jp) has the same domain name (de.fgh.co.jp) as the internet facsimile apparatus 10 (abc@de.fgh.co.jp), it is determined in the step S5 in the flowchart shown in FIG. 3, that the receiver-side fax apparatus C 63 has the same domain name as the internet facsimile apparatus 10 (YES in S5). Therefore, various transmission information is not attached to the image information to be received in the fax apparatus C 63. Consequently, the same image information as that formed on the read medium (shown in FIG. 5B) is received in the fax apparatus C 63 (see FIG. 5C).

FIG. 6C shows the results of the transmission information attachment/non-attachment process carried out when the internet facsimile apparatus 10 (abc@de.fgh.co.jp) (see "From" in FIG. 6A) transmits to the receiver-side fax apparatus A 58 (lmn@op.qrs.co.jp) (see "To" in FIG. 6A) at 14:21 on Thursday, the 14 Jan., 1999 (see "Date" in FIG. 6A), the image information regarding the Japan map (see "Subject" in FIG. 6A). The fax apparatus A 58 (lmn@op.qrs.co.jp) does not have the same domain name (de.fgh.co.jp) as the internet facsimile apparatus 10 (abc@de.fgh.co.jp) (NO in S5). However, the mail address of the fax apparatus A 58 is the one for which non-attachment of the various transmission information is preset, via the attachment/non-attachment setting key 52. Therefore, it is determined as such in the step S7 of the flowchart in FIG. 3 (YES in S7), and various transmission information is not attached to the image information to be received in the fax apparatus A 58. Consequently, the same image information as that formed on the read medium (shown in FIG. 6B) is received in the fax apparatus A 58 (see FIG. 6C).

FIG. 7C shows the results of the transmission information attachment/non-attachment process carried out when the internet facsimile apparatus 10 (abc@de.fgh.co.jp) (see "From" in FIG. 7A) transmits to the receiver-side fax apparatus B 59 (tuv@wx.yza.co.jp) (see "To" in FIG. 7A) at 14:21 on Thursday, the 14 Jan., 1999 (see "Date" in FIG. 7A), the image information regarding the Japan map (see "Subject" in FIG. 7A). The fax apparatus B 59 (tuv@wx.yza.co.jp) does not have the same domain name (de.fgh.co.jp) as the internet facsimile apparatus 10 (abc@de.fgh.co.jp) (NO in S5), or is not the mail address (lmn@op.qrs.co.jp) for which non-attachment of the various transmission information is preset, via the attachment/non-attachment setting key 52 (NO in S7). Therefore, various transmission information is attached to a part of the image information (S13) to be received in the fax apparatus B 59. Consequently, the image information such that the transmission information is attached to the top of the image information on the read medium (shown in FIG. 7B), is received in the fax apparatus B 59 (see FIG. 7C).

As described above, the internet facsimile apparatus 10 may selectively attach or not attach various transmission information, according to the receiver's address information. By storing the receiver's address information for which transmission information is not attached, in the EEPROM 38, via the attachment/non-attachment setting key 52, the user of the facsimile apparatus 10 does not have to change some settings as to the transmission information attachment/non-attachment, every time the image information is sent to the receivers. Therefore, the time required and some burden placed on the user when the image information is transmitted, can be saved and reduced.

The transmission information is selectively attached or not attached according to the domain name of receiver's mail address as in the above-described embodiment, wherein when the input receiver's mail address has the same domain name as the internet facsimile apparatus 10 (YES in S5), the transmission information is not attached. Therefore, the time required and some burden placed on the user when the image information is transmitted, can be saved and reduced.

The transmission information is not attached to image information to be transmitted to receivers having the same domain name in the above-described embodiment, due to the following reasons. The fax apparatus C 63 is often used as a remote printer when the image information is transmitted to a receiver in the same company. When the various transmission information is attached to the image information, the fax apparatus C 63 does not function as a remote printer. In contrast, the attachment of the transmission information attached may be convenient for receivers, except for a particular fax apparatus (for example, fax apparatus A 58), such as when image information is transmitted to a fax apparatus used as a normal facsimile apparatus (for example, fax apparatus B 59).

While the invention has been described with reference to the embodiments, it is to be understood that the invention is not restricted to the particular forms shown in the foregoing embodiments. Various modifications and alternations can be made thereto without departing from the scope of the invention.

For example, in the internet facsimile apparatus 10 according to the embodiments of the invention, when the receiver-side facsimile apparatus has the same domain name as the facsimile apparatus 10, the transmission information is not attached. However, transmission information may be attached when the receiver-side facsimile apparatus has the same domain name as the internet facsimile apparatus 10.

In this case, as described above with reference to FIG. 4, a particular domain name or a particular mail address is input and is shown on the LCD 47 (S21). Thereafter, "ATTACHED" is indicated on the LCD 47 by pressing the attachment/non-attachment setting key 52 (YES in S23), and the enter key 53 is pressed (YES in S25), so that the attachment of the transmission information is set for the address including the particular domain name or the particular mail address (S27).

Further, in the internet facsimile apparatus 10 according to the embodiment of the invention, the receiver's mail address is employed as the receiver's address information. However, the invention may also be applied if the receiver's address information is a receiver's facsimile number for a normal facsimile apparatus other than the internet facsimile apparatus.

Figure 4:
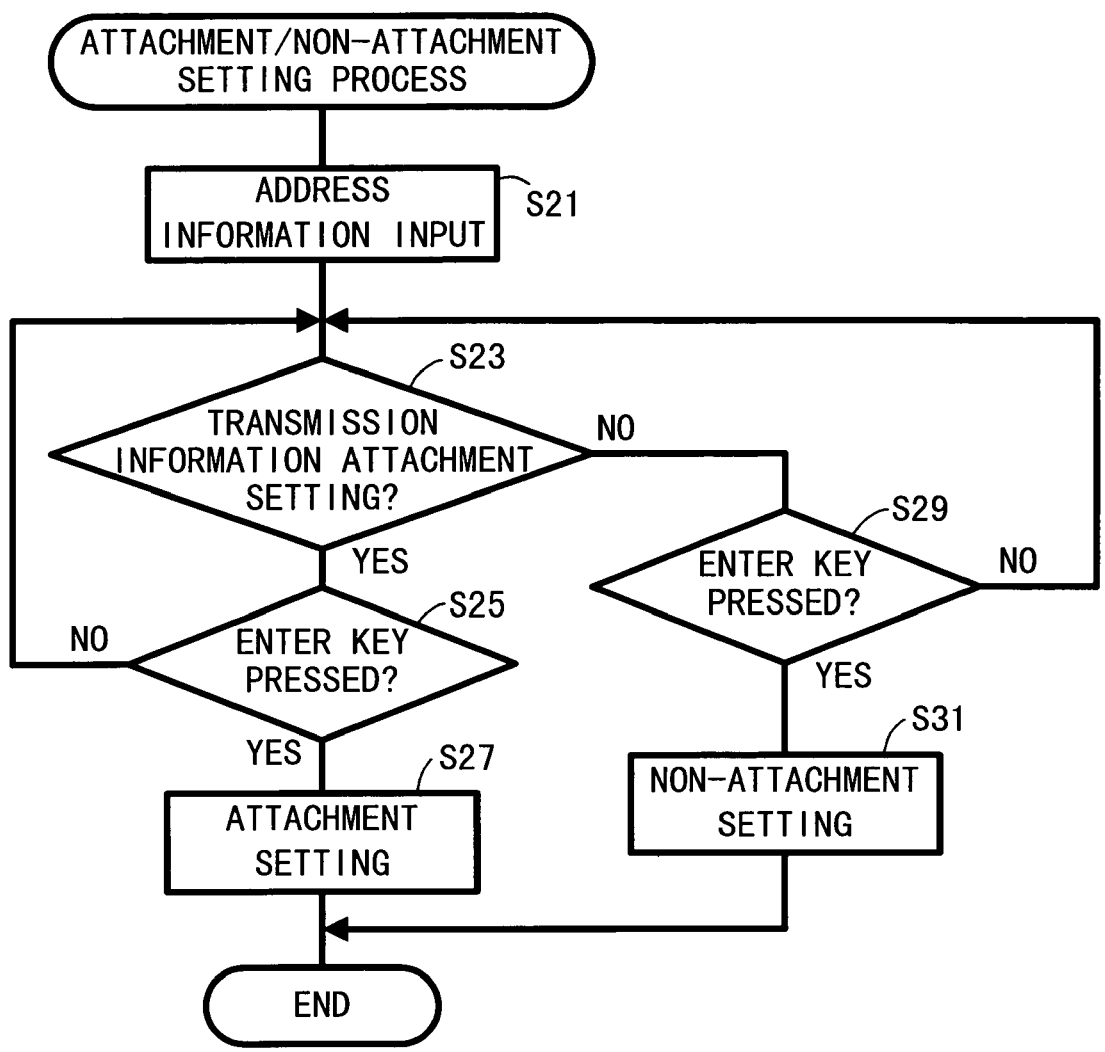
FIG. 4 is a flowchart illustrating a setting process of attaching/not-attaching the transmission information.

In FIG. 4, a facsimile number, for example, 03-1234-5678 is input using the ten-numbered keys 48, instead of the character keys 50, and is shown on the LCD 47 (S21). To set the attachment or non-attachment of the various transmission information for the above-described facsimile number, "ATTACHED" or "NOT-ATTACHED" is indicated on the LCD 47 by pressing the attachment/non-attachment setting key 52 (S23). When either "ATTACHED" or "NOT-ATTACHED" is indicated on the LCD 47 and the enter key 53 is pressed (YES in S25/S29), the attachment/non-attachment of the transmission information is set (S27/S31) for the above-described facsimile number.

Figure 8:
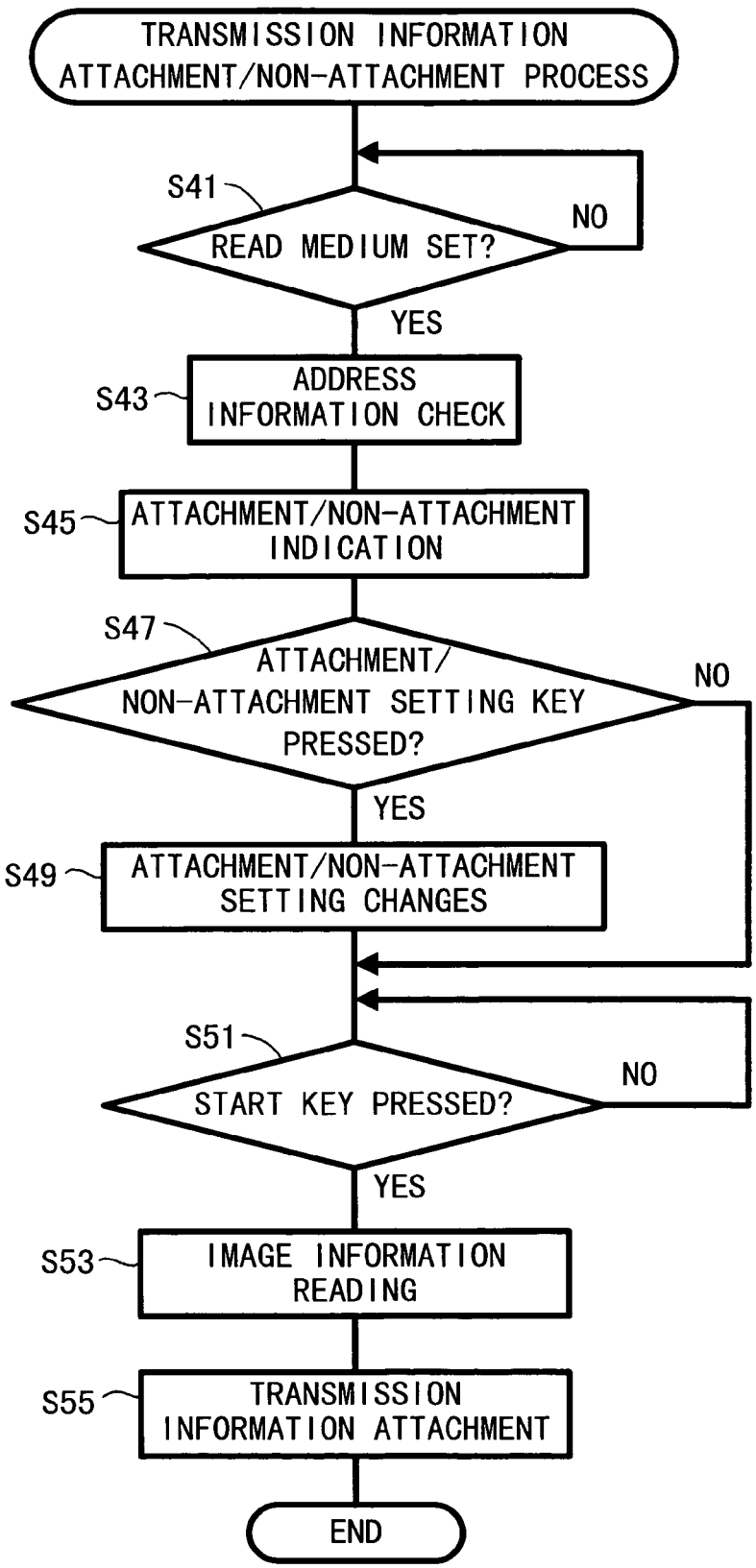
FIG. 8 is a flowchart illustrating a transmission information attachment/non-attachment process according to one embodiment of the invention.

Even when the attachment/non-attachment of the various transmission information has already been set for a receiver, there may be cases when a user would like to transmit certain data or information to the receiver by changing the attachment/non-attachment setting of the various transmission information. In this case, the setting can be changed again in accordance with the steps shown in FIG. 4. However, this may be very inconvenient, so that the following method may be employed. As shown in FIG. 8, after setting the read medium (YES in S41), a user inputs the receiver's mail address or facsimile number using the abbreviation key 51, the ten-numbered keys 48, or the character keys 50. As the receiver's mail address or facsimile number is input, the input receiver's mail address or facsimile number is indicated on the LCD 47 and is checked (S43). Then, the LCD 47 indicates the information as to the attachment/non-attachment setting status of the various transmission information in association with the mail address or the facsimile number (S45). At this time, when the attachment/non-attachment setting key 52 is pressed (S47), the attachment/non-attachment setting of the transmission information may temporarily be changed (S49). This is only a temporary setting, so that the setting returns to the original one after the transmission of the certain data or information is finished. Thereafter, when the start key 45 is pressed (YES in S51), the image information on the read medium is read (S53) and the read image information is transmitted to the receiver (S55), with or without attaching the various transmission information according to the setting.

The-above described embodiment is explained, on the precondition that it is preset that the various transmission information is attached or not attached according to address information. The setting such that the transmission information is attached for all of the address information, may be employed. In addition, even when the attachment/non-attachment setting of the various transmission information is made to "non-attachment," the setting may be changed to "attachment," only by pressing one key (the attachment/non-attachment setting key 52), and vice versa.

Next, the other embodiment is explained. In this embodiment, for all receivers who are registered in abbreviated dials, the transmission information is, for example, attached. The abbreviated dials refer to the abbreviation key 51 to be pressed to input the address information, and one to four character(s) or number(s) (not all characters/numbers of the address information) to be pressed to input the address information using the ten-numbered keys 48 or the character keys 50. When all characters or numbers of a receiver's mail address or facsimile number is input using for example, the ten-numbered keys 48 or the character keys 50 to transmit image information to a receiver who is not registered in the abbreviated dials, the transmission information is not attached.

As shown in FIG. 9, after the read medium is set (YES in S61), the input address information is checked (S63) and it is determined whether the address information is input using the abbreviated dials, or all characters or numbers of the address information are input using the ten-numbered keys 48 or the character keys 50 (S65). When it is determined that the address information is input using the abbreviated dials (YES in S65) and the start key 45 is pressed (S67), the image information on the read medium is read (S69). The various transmission information is attached (S71) and the image information is transmitted to the receiver (S73). When the address information is not input using the abbreviated dials (NO in S65) and the start key 45 is pressed (YES in S75), the image information on the read medium is read (S77).

Without attaching the transmission information, the image information is transmitted to the receiver (S73). In this case, for all receivers who are registered in abbreviated dials, the setting may be changed so that the transmission information may not be attached.

As is apparent from the foregoing description, in this internet facsimile apparatus, the attachment/non-attachment of the various transmission information is selectively determined according to the address information. Therefore, a user of the facsimile apparatus does not have to change some settings as to the transmission information attachment/non-attachment so as to attach or not to attach the transmission information every time the image information is sent to receivers. Consequently, the time required and some burden placed on the user when the image information is transmitted, can be saved and reduced.

Also, in this internet facsimile apparatus, the various transmission information may selectively be attached or not be attached according to the domain name of the receivers. The attachment/non-attachment setting of the transmission information according to the domain name of the receivers, can be easily made, and consequently, the time required and some burden placed on the user when the image information is transmitted, can be saved and reduced.

Further, the various transmission information may be attached or not be attached according receivers having the same or different domain name as the transmitter. The attachment/non-attachment setting of the transmission information according receivers having the same or different domain name as the transmitter, can be easily made, and consequently the time required and some burden placed on the user when the image information is transmitted, can be saved and reduced.

What is claimed is:

1. A communication apparatus that is capable of selectively attaching transmission information to image information and transmitting, via a communication line, the image information, with or without the transmission information attached to a part thereof, to a receiver, the communication apparatus comprising:

an address inputting device for inputting address information of the receiver;

a setting device for selectively setting one of an attaching transmission information setting or a not-attaching transmission information setting for the address information;

a storage device that stores the address information and the selected one of the attaching transmission information setting or the not-attaching transmission information setting for the address information;

a transmission information attaching device that attaches the transmission information to the image information if the attaching transmission information setting is stored for the address information; and a transmission device that transmits the image information without the transmission information attached thereto by the transmission information attaching device when the not-attaching transmission information setting for the address information is selected, wherein the transmission information includes information of at least one of a transmitter, date and time of transmission, and a number of transmitted pages.

2. The communication apparatus according to claim 1, wherein the address information includes a receiver's mail address having an account name and a domain name.

3. The communication apparatus according to claim 1, further comprising:

a changing device for temporarily overriding the previously stored one of the attaching transmission information setting or the not-attaching transmission information setting for the address information.

4. The communication apparatus according to claim 3, wherein the selected setting is displayed on a LCD and the changing device changes the setting being displayed when a key is pressed.

5. A communication apparatus that is capable of selectively attaching transmission information to image information and transmitting, via a communication line, the image information, with or without the transmission information attached to a part thereof, to a receiver, the communication apparatus comprising:

an address inputting device for inputting address information of the receiver;

a setting device for selectively setting one of an attaching transmission information setting or a not-attaching transmission information setting for the address information;

a storage device that stores the address information and the selected one of the attaching transmission information setting or the not-attaching transmission information setting for the address information;

a transmission information attaching device that attaches the transmission information to the image information if the attaching transmission information setting is stored for the address information;

a transmission device that transmits the image information with or without the transmission information attached thereto by the transmission information attaching device based on the selected one of the attaching transmission information setting or the not-attaching transmission information setting for the address information; and a receiver's domain name identifying device that identifies the domain name of the receiver based on the address information of the receiver input via the address inputting device, wherein:

the transmission information includes information of at least one of a transmitter, date and time of transmission, and a number of transmitted pages, the address information includes a receiver's mail address having an account name and a domain name, and the transmission information attaching device determines if the identified domain name of the receiver matches one of previously stored domain names, and if the identified domain name matches one of the previously stored domain names, attaching or not attaching the transmission information to the image information based on the stored selected one of the attaching transmission information setting or the not-attaching transmission information setting for the previously stored matching domain name.

6. The communication apparatus according to claim 5, wherein if the identified domain name matches a domain name of the communication apparatus, the transmission information attaching device does not attach the transmission information to the image information.

7. A communication apparatus that is capable of selectively attaching transmission information to image information and transmitting, via a communication line, the image information, with or without the transmission information attached to a part thereof, to a receiver, the communication apparatus comprising:

an address inputting device for inputting an address information of the receiver, the address information being at least one of an actual address of the receiver or an abbreviated version of the actual address of the receiver;

a transmission information attaching device that selectively attaches the transmission information to the image information to be transmitted to the actual address of the receiver; and a receiver's domain name identifying device that identifies the domain name of the receiver based on the address information of the receiver input via the address inputting device, wherein the transmission information attaching device attaches or does not attach the transmission information to the image information to be transmitted based on the identified domain name, wherein:

the transmission information attaching device determines whether to attach or to not attach the transmission information based on the address information, when the input address information is the abbreviated version of the actual apparatus, the communication apparatus identifies the actual address of the receiver based on the abbreviated version of the actual address and the abbreviated version itself is not another actual address for the receiver, the address information includes a receiver's mail address having an account name and a domain name, and the transmission information includes information of at least one of a transmitter, date and time of transmission, and a number of transmitted pages.

8. The communication apparatus according to claim 7, wherein if the identified domain name matches a domain name of the communication apparatus, the transmission information attaching device does not attach the transmission information to the image information.

9. The communication apparatus according to claim 7, further comprising:

a changing device for temporarily overriding the determination made by the transmission information attaching device based on the address information.

10. A communication apparatus that is capable of selectively attaching transmission information to image information and transmitting, via a communication line, the image information, with or without the transmission information attached to a receiver, the communication apparatus comprising:

an address inputting device for inputting address information of the receiver;

a setting device for selectively setting one of an attaching transmission information setting and a not-attaching transmission information setting for the address information;

a transmission information attaching device that attaches the transmission information to the image information if the attaching transmission information setting is set for the address information; and a receiver's domain name identifying device;

wherein:

if the address information is set with the attaching transmission information setting, the transmission information attaching device attaches the transmission information to the image information, and if the address information is set with the not-attaching transmission information setting, the transmission information attaching device does not attach the transmission information, and the transmission information includes information of at least one of a transmitter, date and time of transmission, and a number of transmitted pages, the address information includes a receiver's mail address having an account name and a domain name, the receiver's domain name identifying device identifies the domain name of the receiver, and the transmission information attaching device attaches or does not attach the transmission information based on the identified domain name of the receiver.

11. The communication apparatus according to claim 10, wherein if the identified domain name of the receiver matches a domain name of the communication apparatus, the transmission information attaching device does not attach the transmission information to the image information.

12. The communication apparatus according to claim 10, further comprising:

a changing device for temporarily overriding the set one of the attaching transmission information setting or the not-attaching transmission information setting for the address information.

13. A communication apparatus that is capable of selectively attaching transmission information to image information and transmitting, via a communication line, the image information, with or without the transmission information attached to a part thereof, to a receiver, the communication apparatus comprising:

an address inputting device for inputting address information of the receiver;

a setting device for setting, based on the address information, one of an attaching transmission information setting for attaching the transmission information to the image information or a not-attaching transmission information setting for not attaching the transmission information to the image information;

a changing device for one of changing or maintaining a current setting of one of the attaching transmission information setting or the not attaching transmission information setting of the setting device for the address information;

a transmission information attaching device that determines whether to attach or not to attach the transmission information to the image information based on the setting of the setting device and whether the changing device is set to change or maintain the current setting of the setting device; and a transmission device that transmits to the receiver the image information without the image transmission information attached when the transmission information attaching device determines, based on the address information input by the address inputting device, that the not-attaching transmission information setting for not attaching the transmission information to the image information is set, wherein the transmission information includes information of at least one of a transmitter, date and time of transmission, and a number of transmitted pages.

14. The communication apparatus according to claim 13, wherein the address information includes a receiver's mail address having an account name and a domain name.

15. The communication apparatus according to claim 13, wherein the current setting is displayed on a LCD and the changing device changes the setting being displayed when a key is pressed.

16. A communication apparatus that is capable of selectively attaching transmission information to image information and transmitting, via a communication line, the image information, with or without the transmission information attached to a part thereof, to a receiver, the communication apparatus comprising:

an address inputting device for inputting address information of the receiver;

a setting device for setting, based on the address information, one of an attaching transmission information setting for attaching the transmission information to the image information or a not-attaching transmission information setting for not attaching the transmission information to the image information;

a changing device for one of changing or maintaining a current setting of one of the attaching transmission information setting or the not attaching transmission information setting of the setting device for the address information;

a transmission information attaching device that determines whether to attach or not to attach the transmission information to the image information based on the setting of the setting device and whether the changing device is set to change or maintain the current setting of the setting device;

a transmission device that transmits to the receiver the image information with or without the image transmission information attached based on the determination of the transmission information attaching device, according to the address information input by the address inputting device, wherein the transmission information includes information of at least one of a transmitter, date and time of transmission, and a number of transmitted pages; and a receiver's domain name identifying device, wherein:

the address information includes a receiver's mail address having an account name and a domain name, the receiver's domain name identifying device identifies the domain name of the receiver, the transmission information attaching device determines whether to attach or not to attach the transmission information to the image information based on the identified domain name of the receiver, and if the identified domain name of the receiver matches a domain name of the communication apparatus, the transmission information attaching device determines that the transmission information is not to be attached to the image information.

17. A communication apparatus that is capable of selectively attaching transmission information to image information and transmitting, via a communication line, the image information, with or without the transmission information attached to a part thereof, to a receiver, the communication apparatus comprising:

an address inputting device for inputting address information of the receiver;

a storage device that stores at least one portion of the receiver's address information input by the address inputting device and one of an attaching transmission information setting or a non-attaching transmission information setting for the receiver's address;

a determination device that determines whether the address information of the receiver to whom the image information is to be transmitted, matches previously stored address information in the storage device or address information newly input via the address inputting device;

a transmission information attaching device that attaches or does not attach the transmission information to the image information, based on the determination made by the determination device;

a transmission device that transmits to the receiver the image information, according to the receiver's address information; and a receiver's domain name identifying device, wherein:

if the determination device determines that the address information matches the previously stored address information, the determination device determines which of the attaching transmission information setting or the non-attaching transmission information setting is stored for the address information, if the determination device determines that the address information is newly input address information, the determination device determines whether to attach or not to attach the transmission information to the image information based on a current setting of an attaching/not attaching transmission information function of the communication apparatus, the transmission information includes information of at least one of a transmitter, date and time of transmission, and a number of transmitted pages, the address information includes a receiver's mail address having an account name and a domain name, the receiver's domain name identifying device identifies the domain name of the receiver, and the transmission information attaching device determines whether to attach or not to attach the transmission information to the image information based on the identified domain name of the receiver.

18. The communication apparatus according to claim 17, wherein if the identified domain name of the receiver matches a domain name of the communication apparatus, the transmission information attaching device does not attach the transmission information to the image information.

19. The communication apparatus according to claim 17, further comprising:

a changing device for setting the attaching/not attaching transmission information function of the communication device.

20. A communication apparatus that is capable of selectively attaching transmission information to image information and transmitting, via a communication line, the image information, with or without the transmission information attached to a part thereof, to a receiver, the communication apparatus comprising:

a control panel for inputting at least one of address information, the address information being or identifying an actual address of the receiver, and the actual address of the receiver including a domain name and an account name of the receiver; and a transmission information attaching device that determines whether to attach or not to attach the transmission information to the image information based on at least one of the domain name or the actual address of the receiver;

wherein:

if the domain name of the receiver matches a domain name of the communication apparatus, the transmission information attaching device does not attach the transmission information to the image information, and if the domain name of the receiver does not match the domain name of the communication apparatus, the transmission information attaching device determines whether the actual address is associated with an attaching transmission information function of the communication apparatus and if the actual address is associated with the attaching transmission information function, the transmission information attaching device attaches the transmission information and if the actual address is not associated with the attaching transmission information function, the transmission information attaching device does not attach the transmission information to the image information.

* * * * *